(12) United States Patent
Vezzoli

(10) Patent No.: US 11,097,352 B2
(45) Date of Patent: Aug. 24, 2021

(54) DEVICE FOR THE QUICK CHANGE OF TOOL HOLDER ADAPTERS

(71) Applicant: ALGRA S.P.A., Val Brembilla (IT)

(72) Inventor: Giovanni Vezzoli, Val Brembilla (IT)

(73) Assignee: ALGRA S.P.A., Val Brembilla (IT)

( * ) Notice: Subject to any disclaimer, the term of this patent is extended or adjusted under 35 U.S.C. 154(b) by 0 days.

(21) Appl. No.: 16/928,337

(22) Filed: Jul. 14, 2020

(65) Prior Publication Data

US 2021/0016372 A1    Jan. 21, 2021

(30) Foreign Application Priority Data

Jul. 15, 2019   (IT) .......................... 102019000011742

(51) Int. Cl.
  *B23B 31/00*   (2006.01)
  *B23B 51/12*   (2006.01)

(52) U.S. Cl.
  CPC .......... *B23B 31/006* (2013.01); *B23B 51/123* (2013.01); *B23B 2231/0296* (2013.01)

(58) Field of Classification Search
  CPC ... B23B 31/006; B23B 31/008; B23B 51/123; B23B 2231/0296
  See application file for complete search history.

(56) References Cited

U.S. PATENT DOCUMENTS

| | | | | |
|---|---|---|---|---|
| 4,723,877 A | * | 2/1988 | Erickson | B23B 29/046 279/2.11 |
| 6,045,308 A | * | 4/2000 | Frank | B23B 31/006 408/239 R |
| 6,415,696 B1 | * | 7/2002 | Erickson | B23B 29/046 403/374.3 |
| 7,234,902 B2 | * | 6/2007 | Stojanovski | B23B 31/113 279/8 |

(Continued)

FOREIGN PATENT DOCUMENTS

| | | |
|---|---|---|
| DE | 4003485 A1 | 9/1990 |
| DE | 102007033167 A1 | 1/2009 |
| WO | 0115841 A1 | 3/2001 |

OTHER PUBLICATIONS

Search Report from Priority Application No. IT 2019000011742 dated Mar. 25, 2020.

*Primary Examiner* — Eric A. Gates
(74) *Attorney, Agent, or Firm* — Abelman, Frayne & Schwab

(57) ABSTRACT

A device for the quick change of tool holder adapters, especially for use on CNC machine tools such as multi-spindle or single-spindle lathes, turning and milling centres, transfer machine tools, for orienting and clamping the different tool holder shanks in the appropriate seats of the rotating and non-rotating shafts present in the mechanical bodies such as motorised or non-motorised tool holders, multiple or single, comprising a tool holder shank of truncated-cone shape designed to fit, starting from its smaller (Continued)

diameter rear part, into a complementary housing made in the rotating shaft of a motorised module. On the smaller diameter rear face of the tool holder shank a milling cut is made configured to accommodate at least one removable insert which protrudes partly frontally in the direction of a recess made on the back wall of the tapered seat of the rotating shaft of the motorized module.

3 Claims, 2 Drawing Sheets

(56) References Cited

U.S. PATENT DOCUMENTS

| | | | | |
|---|---|---|---|---|
| 7,364,393 B2* | 4/2008 | Collingwood | ........ | B23B 31/006 |
| | | | | 408/8 |
| 7,610,834 B2* | 11/2009 | Erickson | ............... | B23B 29/046 |
| | | | | 409/234 |
| 8,425,164 B2* | 4/2013 | Gerber | .................... | B23B 31/02 |
| | | | | 409/131 |
| 8,601,918 B2* | 12/2013 | Erickson | ............... | B23B 31/006 |
| | | | | 82/160 |
| 8,807,880 B2* | 8/2014 | Erickson | ................ | B23B 31/02 |
| | | | | 407/11 |
| 2005/0089382 A1 | 4/2005 | Stojanovskj | | |
| 2016/0339527 A1 | 11/2016 | Jansen et al. | | |

\* cited by examiner

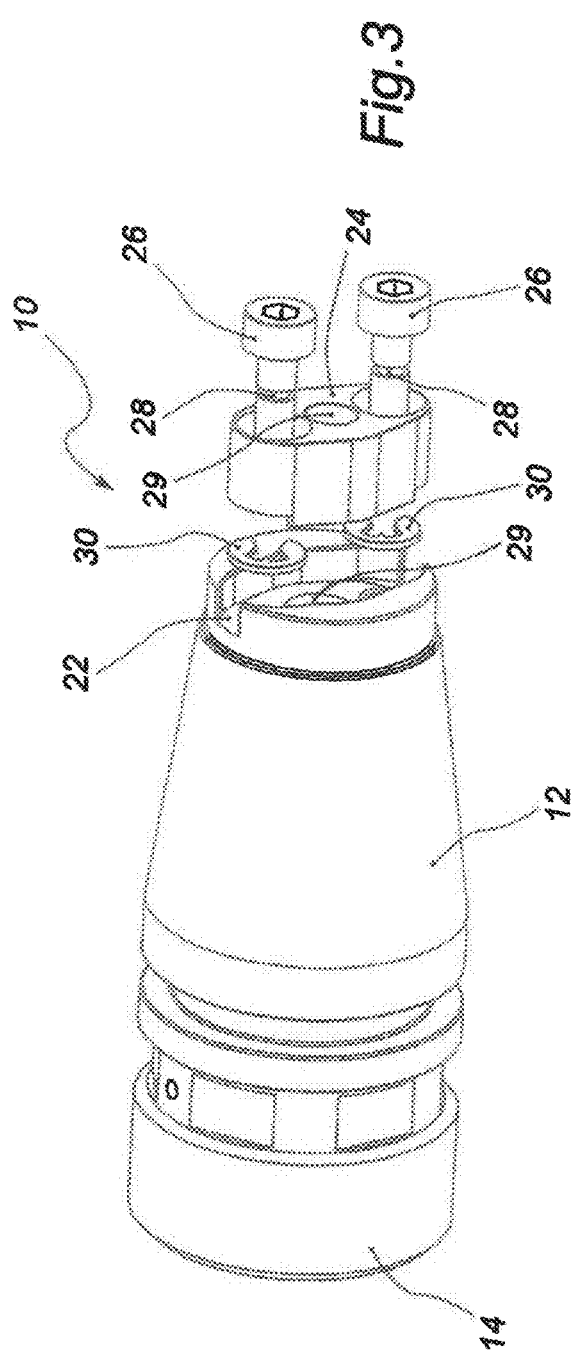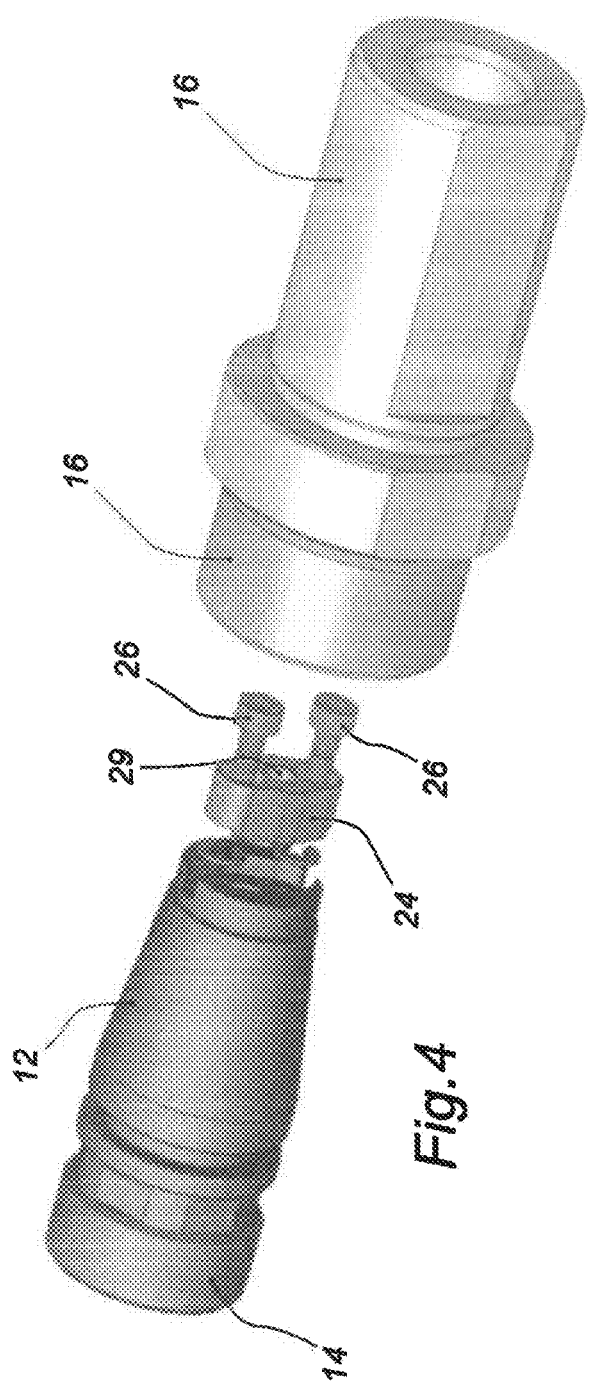

DEVICE FOR THE QUICK CHANGE OF TOOL HOLDER ADAPTERS

CROSS REFERENCE TO RELATED APPLICATION

This application claims priority to Italian application No. 102019000011742 filed Jul. 15, 2019, the content of which is incorporated by reference in its entirety.

FIELD OF INVENTION

The present invention relates to a device for the quick change of tool holder adapters. More specifically, the present invention relates to a device suitable to allow the quick change of motorised or non-motorised tool holders, constructed with the ER type fastening predisposition; the device is used on CNC machine tools such as multi-spindle or single-spindle lathes, turning and milling centres, transfer machine tools, for orienting and clamping the different tool holder shanks in the appropriate seats of the rotating and non-rotating shafts present in the mechanical bodies known as motorised or non-motorised tool holders, multiple or single tool holders.

BACKGROUND OF THE INVENTION

The tool holder body, as is known, may have various shapes according to the specific machining for which it is intended, while the shank traditionally defines a truncated cone shape with standard dimensions for insertion in a complementary housing made on the rotating shaft of the motorised module.

Various solutions are known for the quick change of the adapters for replacing the operating tools installed on the above mentioned machine tools. For example, US 2016/0339527 discloses a tool holder with collet holder and its insert; according to this solution, a tool holder with a collet holder can receive other tools in addition to the collet and the replacement of a collet holder with a different insert can be performed quickly.

US20050089382 refers to a milling tool holder the shank of which defines a tapered opening with threaded plug and a complementary male end; the tool holder uses a differential displacement adjustment screw and the spindle is equipped with a Morse Cone type shank. WO01/15841 discloses the solution of creating a tool holder assembly comprising a bolt and a locking nut; depending on the direction of rotation of the nut, the tool holder is either locked or released. DE 10 2007 033167 describes a modular tool system, in which a basic tool holder is equipped with at least one hole for inserting the tool holder shaft, secured by a clamping device and comprising a cutting insert. DE 40 03 485 relates to a coupling system for a cutting tool in which a removable clamp fixes the tool to the body in an axial direction.

The tool holder shanks of the various manufacturers have specific shape characteristics at the rear, which is intended to engage in the rotating shaft housing of the motorised module; the end user can thus use tool shanks of different manufacturers only when combined with specific motorised modules, a solution which, however, entails high costs.

In a traditional embodiment, which is still current for some machining, the coupling between the truncated cone shank and the motorised module shaft can instead take place without any means of engagement with said housing of the rotating shaft being present in the rear part of said shanks.

SUMMARY

The purpose of the present invention is to overcome the drawback complained of above with reference to the need to use different shanks only in the presence of specific motorised modules.

More specifically, the purpose of the present invention is to provide a device for the quick change of tool holder adapters suitable to allow the flexible use of a shank, regardless of the type of motorised module and its origin as regards manufacture, assuming in any case that the attachment shape is of the ER type.

A further and related purpose of the invention is to provide a device as defined above that allows the shank to be configured in the most suitable shape for fixing the tool to be used at the time.

A further purpose of the invention is to make available to users a device for the quick change of tool holder adapters suitable to ensure a high level of resistance and reliability over time, in addition such as to be easily and economically made.

These and other purposes are achieved by the device of the invention according to the main claim.

BRIEF DESCRIPTION OF THE DRAWINGS

The construction and functional characteristics of the device for the quick change of tool holder adapters of the present invention will be more clearly comprehensible from the detailed description below in which reference is made to the appended drawings which show a preferred and non-limiting embodiment and wherein:

FIG. 3 shows schematically, in an enlarged axonometric view, a part of the device in FIG. 1;

FIG. 4 schematically represents the axonometric view of a part of the device in FIG. 3 coupled to the free end of the rotating shaft.

DETAILED DESCRIPTION

Figure 1:
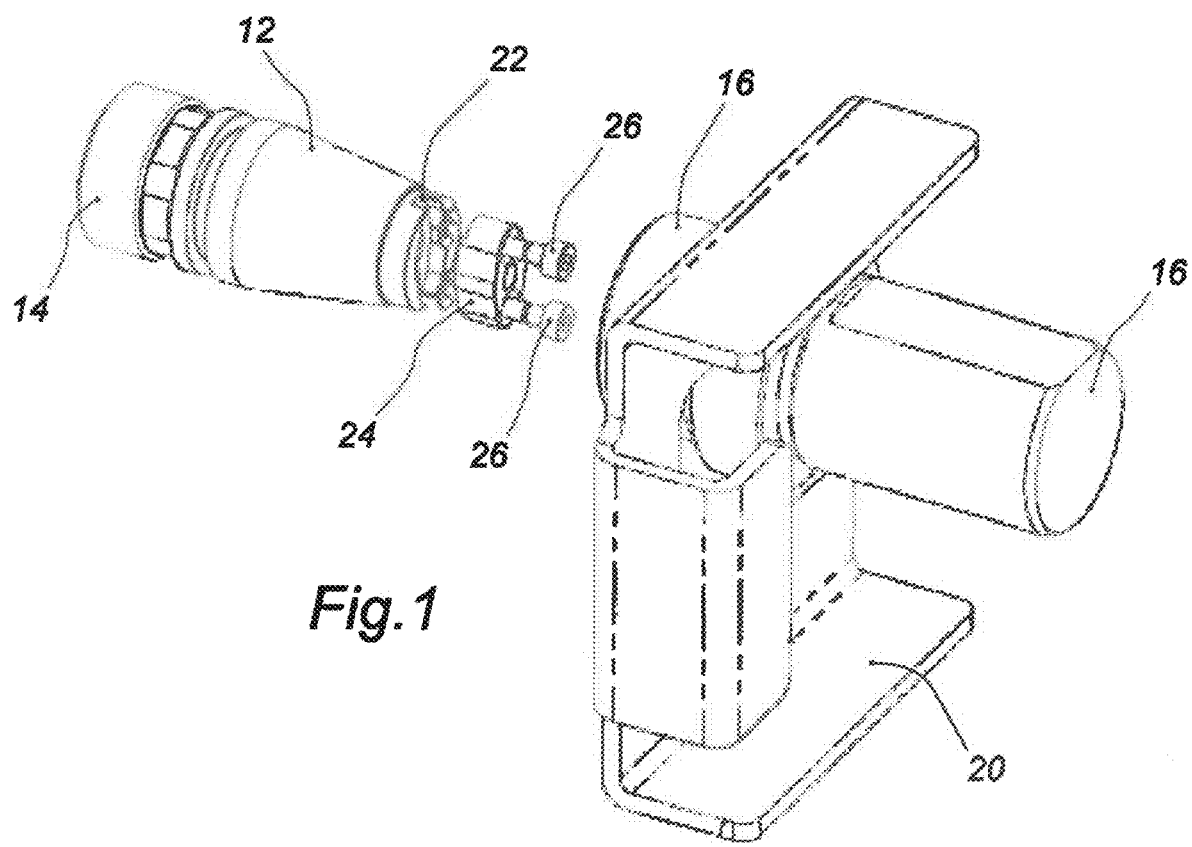
FIG. 1 schematically represents an axonometric view of the device of the invention, of the free end of the rotating shaft of the motorised module into which it is inserted, as well as the conventional key used for the temporary locking of such shaft.

With reference to the aforesaid figures, the device for the quick change of tool holder adapters of the present invention is globally denoted by reference numeral 10 in FIG. 3 and comprises a truncated cone shaped tool holder shank 12; said shank is, for example, coupled with a ring nut 14, which is not part of the device described and claimed in this application but belongs, together with other components, to a different context protected independently by a parallel application filed by the same applicant. The truncated cone shank 12 is intended to fit, starting from its smaller diameter rear face, into a complementary housing traditionally made in the rotating shaft 16 of the motorised module, or into a fixed support of a standard tool holder. A conventional shaped key 20 is used to avoid the possible rotation of said shaft 14 when the truncated cone shank 12 is inserted in it.

According to the invention, on the smaller diameter rear face of said shank 12, a milling cut 22 is made, preferably with a diametrical extension, configured so as to accommodate a removable insert 24; said insert, of any shape and extension, is such as not to protrude from the perimeter edge of the rear face of the shank 12, with respect to which it instead protrudes frontally in the direction of a recess 32 made on the back wall 18 of the tapered seat of the rotating shaft 16 of the motorised module.

According to a preferred, non-critical embodiment, the removable insert 24 defines a lozenge configuration with rounded edges, but it is understood that it may be any shape, e.g. regular or irregular prismatic, and be made in one piece or in two complementary parts; said insert 24 is provided with one or more through holes in which are arranged respective screws 26, e.g. of the Allen type with cylindrical head, intended to engage in corresponding threaded holes made on shank 12. The latter is provided centrally with an additional hole, schematically shown by reference numeral 29 in FIGS. 3, 4 and placed between the screws 26 of the insert 24, which also crosses the shank and performs the traditional function of allowing the passage of a fluid to reach and cool the tool from time to time used, at the point Where contact with the material being machined occurs.

Figure 2:
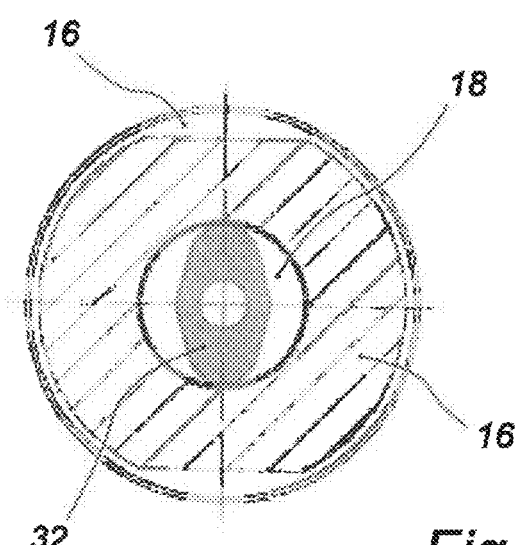
FIG. 2 schematically represents a front view of the rotating shaft present in the motorised module to which the device is coupled.

At the same time, the rotating shaft 16 of the motorised module is provided with the above-mentioned recess 32, schematically shown in FIG. 2, in which the removable insert 24 fixed to the shank 12 is fitted. Said insert has the function of orienting and preventing the possible rotation of the shank 12 when the latter is subjected to heavy machining operations. In other situations, the removable insert 24 can advantageously be removed from the shank 12, to allow the end user to use, as desired, tool holder shanks from different manufacturers with an ER-type connection; in this case the connection is made according to the traditional system, i.e. by coupling the conical surfaces on the shank and on the rotating shaft.

In practice, by means of the device of the present invention, the possibility of a dual use is achieved in an extremely advantageous manner; this without any increase in the costs which instead would have to be sustained for specific motorised modules, in order to be able to also use traditional tool shanks of different manufacturers.

The attachment and removal of the removable insert 24 with respect to the shank 12 is carried out in an extremely simple and quick manner by acting on the pair of screws 26; the stem of each is provided with a radial groove 28 in which a radial elastic ring 30 is placed, in order to prevent the accidental release of the screws and to facilitate at the same time the handling and storage of said removable insert 24 when not used.

As may be seen from the above, the advantages which the invention achieves are evident.

The device for the quick change of tool-holder adapters of the present invention is flexible from an operational point of view as it allows use in a dual manner, with or without the removable insert 24 applied to the tool-holder shank 12; in the first case the solution allows the orientation and prevention of the possible rotation of the shank when it is subjected to heavy machining operations, in the second case it allows the use also of conventional tool-holder shanks of different manufacturers without additional costs as there is no need of as many specific motorised modules.

Despite the invention having been described above with reference to one of its embodiments, given solely by way of a non-limiting example, numerous modifications and variants will appear evident to a person skilled in the art in the light of the above description. The present invention therefore sets out to embrace all the modifications and variants which fall within the sphere and scope of the following claims.

What is claimed is:

1. A device for the quick change of a tool holder adapter for use on CNC machine tools having a motorized module with a rotating shaft, the rotating shaft having a back wall with a recess defining a tapered seat, the device, comprising:
    a tool holder shank having a truncated-cone shape body with a front end and a rear end, the front end having a diameter greater than a diameter of the rear end, the rear end configured to be received into a complementary housing of the rotating shaft of the motorised module, wherein a rear face at the rear end of said tool holder shank of the truncated-cone shape includes a milling cut configured to accommodate at least one removable insert;
    wherein the removable insert defines a lozenge configuration with rounded edges and extends diametrically into the milling cut of the tool holder shank, the removable insert protruding partly frontally in a direction of the recess formed on the back wall of the rotating shaft of said motorized module; and
    wherein the removable insert is provided with one or more through holes in which are arranged with one or more respective screws to selectively engage in corresponding threaded holes formed in the tool holder shank (12).

2. The device according to claim 1, wherein a stem of each of the one or more screws is provided with a groove in which is placed a removable radial clamping ring.

3. The device of claim 1, wherein the CNC machine includes one of a multi-spindle or single-spindle lathe, a turning and milling center, or transfer machine tools, said CNC machine being configured to orientate and clamp different tool holders shanks in the seat of a rotating or non-rotating shaft of a motorized or non-motorized tool holder.

* * * * *